United States Patent [19]

Brennan et al.

[11] 4,314,852

[45] Feb. 9, 1982

[54] SILICON CARBIDE FIBER REINFORCED GLASS COMPOSITES

[75] Inventors: John J. Brennan, Portland; Karl M. Prewo, Vernon, both of Conn.

[73] Assignee: United Technologies Corporation, Hartford, Conn.

[21] Appl. No.: 147,672

[22] Filed: May 7, 1980

[51] Int. Cl.³ .................. C04B 35/56; C03C 3/04; C03C 3/08

[52] U.S. Cl. .................. 501/88; 501/89; 501/95; 501/65; 501/68

[58] Field of Search .................. 106/44, 52, 54

[56] References Cited

U.S. PATENT DOCUMENTS

| | | | |
|---|---|---|---|
| 3,161,473 | 12/1964 | Pultz | 423/345 |
| 3,386,840 | 6/1968 | Gruber | 106/44 |
| 3,509,072 | 4/1970 | Barrington et al. | 106/44 |
| 3,653,851 | 4/1972 | Gruber | 106/44 |
| 3,892,583 | 7/1975 | Winter et al. | 106/44 |
| 4,060,424 | 11/1977 | Hofmann | 106/44 |
| 4,158,687 | 6/1979 | Yajima et al. | 106/44 |

Primary Examiner—O. R. Veritz
Assistant Examiner—Mark Bell
Attorney, Agent, or Firm—Harry J. Gwinnell

[57] ABSTRACT

Silicon carbide fiber reinforced glass composites are disclosed having high strength, fracture toughness, and oxidative stability, even in high temperature use environments. Disclosed composites include silicon carbide fiber reinforced borosilicate glass, high silica content glass, and aluminosilicate glass. Flexural strengths in excess of 40,000 psi up to temperatures as high as 1150° C. are attained with such composites.

10 Claims, 4 Drawing Figures

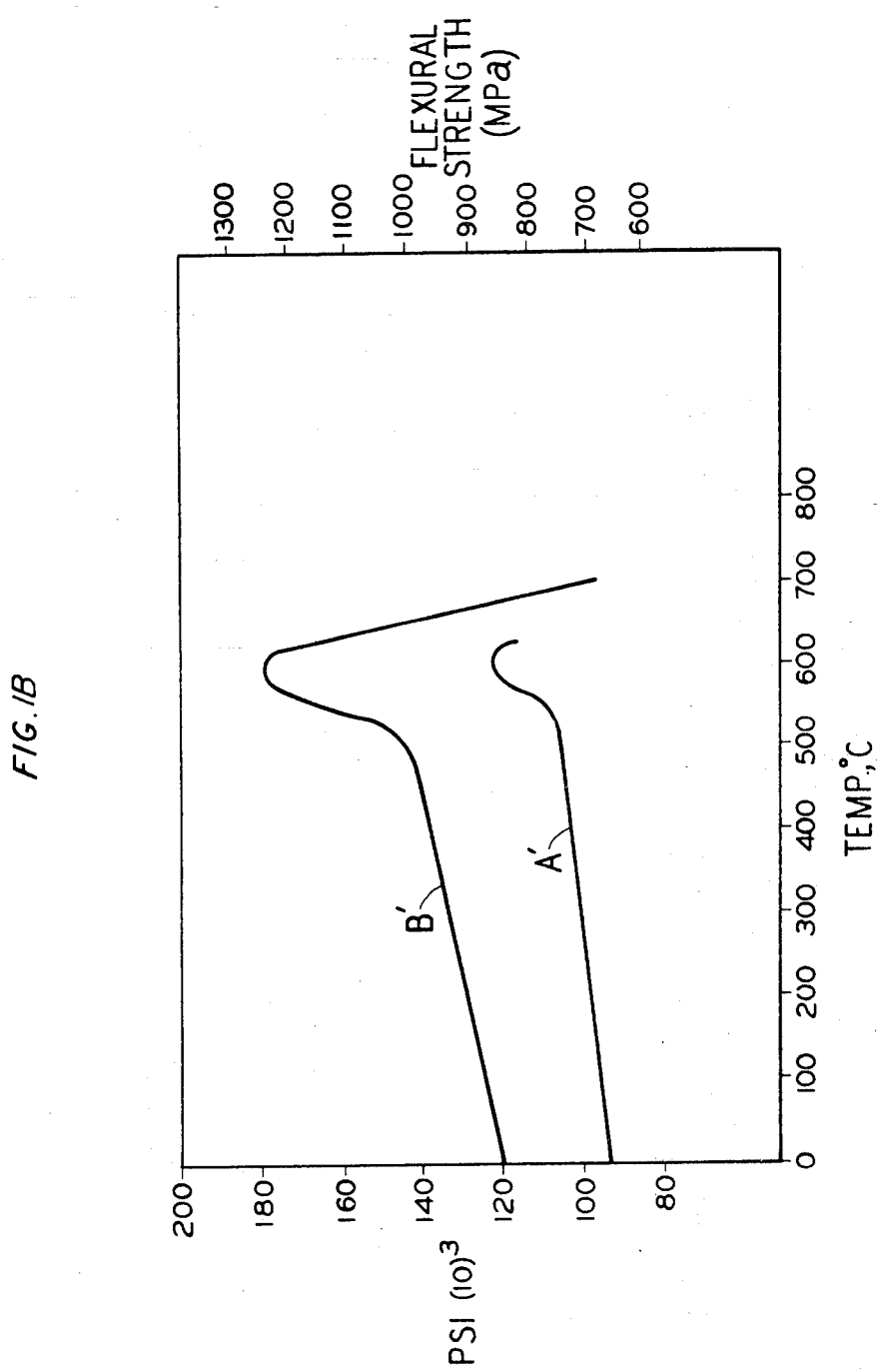
FIG. IB

SILICON CARBIDE FIBER REINFORCED GLASS COMPOSITES

CROSS REFERENCE TO RELATED APPLICATION

U.S. Patent Application Ser. No. 121,081, filed Feb. 13, 1980 by the same inventors as the present application and commonly assigned is directed to silicon carbide fiber reinforced ceramic composites.

DESCRIPTION

1. Technical Field

The field of art to which this invention pertains is fiber reinforced composites.

2. Background Art

Because of the scarcity and increasing expense of many conventional high temperature structural metals, increased attention has focused on non-metal containing composites as replacements for conventional high temperature metal-containing materials. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature. And while great strides have been made in raising the use temperature, for example by utilizing such composites as graphite fiber reinforced glass and alumina fiber reinforced glass, there is still much room for improvement. For example, while the graphite fiber reinforced glass composite demonstrates high levels of strength, fatigue resistance, and fracture toughness, it is also susceptible to detrimental fiber oxidation at elevated temperatures. And while composites such as alumina fiber reinforced glass are oxidatively stable at high temperatures, the overall strength and toughness levels obtainable with these composites is less than that possible with a graphite reinforced glass system, for example. Accordingly, what is needed in the art is a composite with high strength, high fracture toughness, and oxidation stability at high temperatures.

DISCLOSURE OF INVENTION

The present invention is directed to a solution to the strength, fracture toughness, and oxidation stability problems which exist with composites of the prior art and comprises silicon carbide reinforced glass composites having high strength, fracture toughness, and oxidation stability, even at high temperatures.

In one aspect of the invention a borosilicate based glass is utilized and composites with flexural strengths above about 60,000 psi maintainable at temperatures up to about 600° C. are produced.

In another aspect of the invention a high silica content glass is used and flexural strengths above about 60,000 psi maintainable at temperatures up to about 1150° C. are produced.

In another aspect of the invention an aluminosilicate glass is used and composites with a flexural strength above about 75,000 psi maintainable at temperatures up to about 700° C. are produced.

BRIEF DESCRIPTION OF DRAWINGS

FIG. 1B shows graphically flexural strength data for a borosilicate glass composite reinforced with large diameter silicon carbide monofilaments according to the present invention.

BEST MODE FOR CARRYING OUT THE INVENTION

Figure 1A:
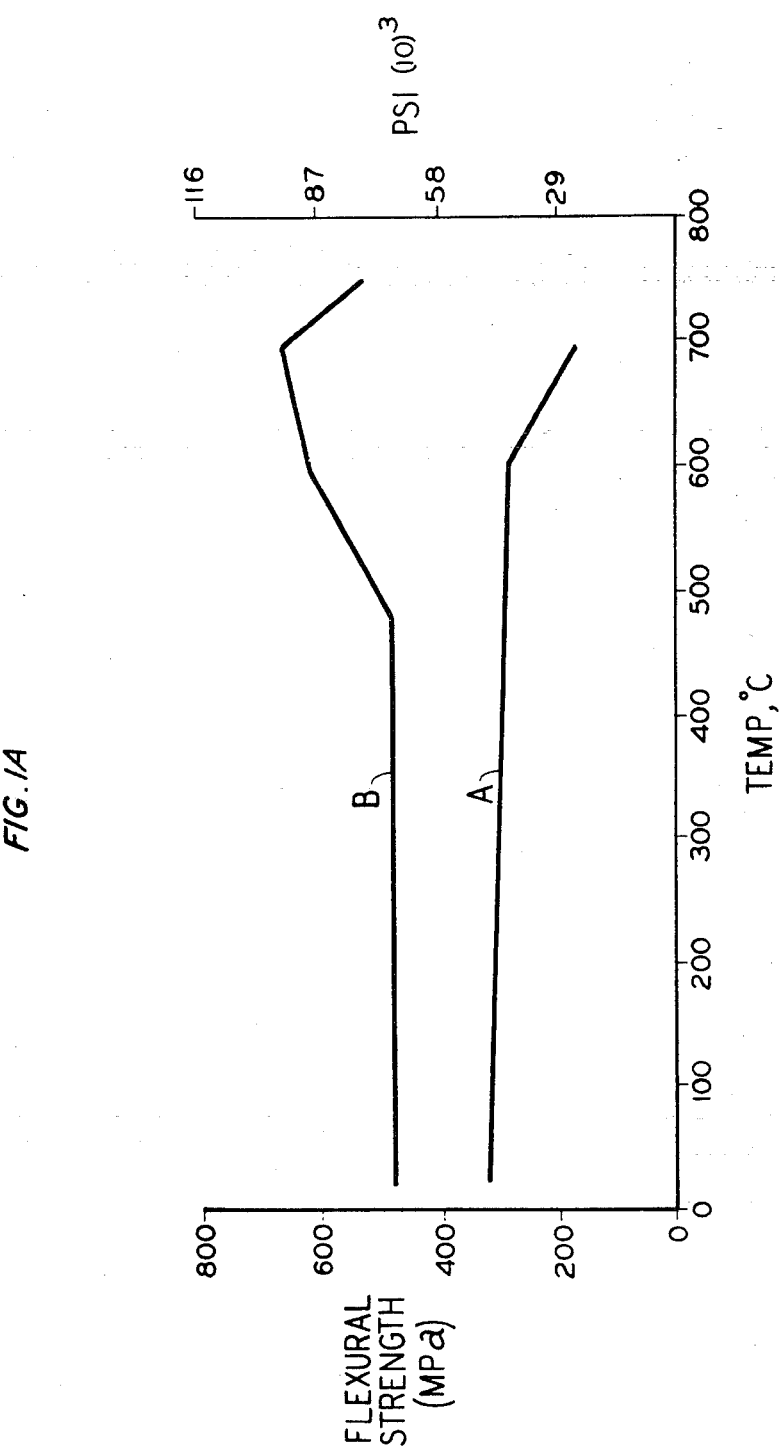
FIG. 1A shows graphically flexural strength data for a borosilicate glass composite reinforced with silicon carbide yarn according to the present invention.

While any borosilicate glass which will impart the described properties can be used with the present invention, Corning 7740 (Corning Glass Works) was found particularly suitable to produce such properties. Similarly, Corning 7930 (about 96% by wt. silica), obtained by leaching the boron from a borosilicate glass, and Corning 1723 are the preferred high silica content glass and aluminosilicate glass, respectively. While the borosilicate glass and the aluminosilicate glass can be used in its as received $-325$ mesh size form, the desired properties for the high silica content glass composites can only be satisfactorily fabricated with the glass after it has been ball-milled in propanol for more than 100 hours. It should also be noted that mixtures of the above glasses may also be used, with properties tailored accordingly.

Any silicon carbide fiber system with the requisite strength can be used, although a multi-filament silicon carbide yarn with an average filament diameter up to 50 microns is preferred and yarn with average filament diameter of 5 to 50 microns is especially preferred. Nippon Carbon Company of Japan produces such a yarn with about 250 fibers per tow and an average fiber diameter of about 10 microns. The average strength of the fiber is approximately 2000 MPa (300,000 psi), and it has a use temperature of up to 1500° C. The yarn has a density of approximately 2.7 grams per cc and an elastic modulus of approximately 221 GPa ($32 \times 10^6$ psi). If a silicon carbide monofilament is used, a typical silicon carbide monofilament of approximately 140 microns diameter is available from AVCO Systems Division, Lowell, Mass. This fiber exhibits an average tensile strength of up to 3450 MPa, has a temperature capability of over 1300° C. and is stable in oxidizing environments.

While a variety of methods can be used to produce the articles of the present invention, e.g. methods conventionally used to produce glassware articles, the preferred method is by hot pressing a mixture of the silicon carbide fibers and powdered glass. This method provides particular design flexibility in orienting the fibers, and composites formed by such method are particularly well adapted to hot pressing into desired shapes. An exemplary method comprises continuously unwinding a tow of silicon carbide fibers from a spool at a moderate rate of speed and passing such fibers through a slip of the powdered glass, plus solvent and plasticizer to impregnate the tow. The impregnated fibers are then rewound onto a larger rotating spool. An exemplary slip composition may be composed of approximately 40 grams of powdered glass and approximately 780 ml of propanol. An alternative composition may comprise approximately 85 grams of the glass and 200 grams of propanol, 10 grams of polyvinyl alcohol and 5 drops (approximately 1 cc) of a wetting agent such as Tergitol. The receiving drum is preferably run at one revolution per minute or at a linear speed of approximately 5 feet per minute. Excess glass and solvent can be removed by pressing a squeegee against the drum as it winds. Preferably the ground glass is sized so that approximately 90% of it passes through a −325 mesh sieve. The impregnated tape is then dried either at ambient temperature or at elevated temperature with a radiant heating source to remove the solvent.

Following the impregnation, the fiber is removed from the drum and cut into strips to conform to the dimensions of the article to be fabricated. The fibers are then laid in any desired orientation. The assembled composite is then hot pressed, either under vacuum or inert gas such as argon, in metal dies coated with colloidal boron nitride, or graphite dies sprayed with boron nitride powder, at pressures of 6.9 to 13.8 MPa (1000-2000 psi) and temperatures of approximately 1050°-1450° C. Additional glass in the form of powder may also be inserted between individual layers as they are laid if necessary to achieve the preferred 50% by volume loading of silicon carbide fiber in a composite. Also, the mold can be vibrated to ensure uniform distribution of the glass over the laid fiber surfaces. The fibers can be laid up relative to one another in alternating ply stacks in any sequence desired, e.g. each layer with fibers unidirectional (0° orientation), alternating plies of fiber oriented 0° and 90° or 0°/30°/60°/90°, 0°/±45°/90°, etc.

In addition to exhibiting excellent fracture toughness and high flexural strength, the composites of the present invention maintain these properties even up to exceptionally high temperatures. FIG. 1A demonstrates the exceptional flexural strength of a borosilicate glass-silicon carbide fiber reinforced composite utilizing silicon carbide yarn. For a 0°/90° fiber orientation (curve A), flexural strengths of over 40,000 psi up to temperatures of about 600° C. were attained. For 0° fiber orientation (curve B) flexural strengths of over 60,000 psi up to temperatures of about 600° C. were attained. And as seen in FIG. 1B, the (0° oriented) silicon carbide fiber monofilament reinforced borosilicate glass (Corning 7740) composites also exhibit high flexural strengths above 60,000 psi and as specifically demonstrated by curves A and B above 75,000 psi for curve A (35% by volume fiber loading) and above 100,000 psi for curve B (65% by volume fiber loading) which flexural strengths are maintainable at temperatures up to about 600° C. The 0°/90° silicon carbide fiber orientation in the borosilicate glass matrix produces a flexural strength above about 40,000 psi and preferably above about 50,000 psi maintainable to temperatures up to about 600° C.

Figure 2:
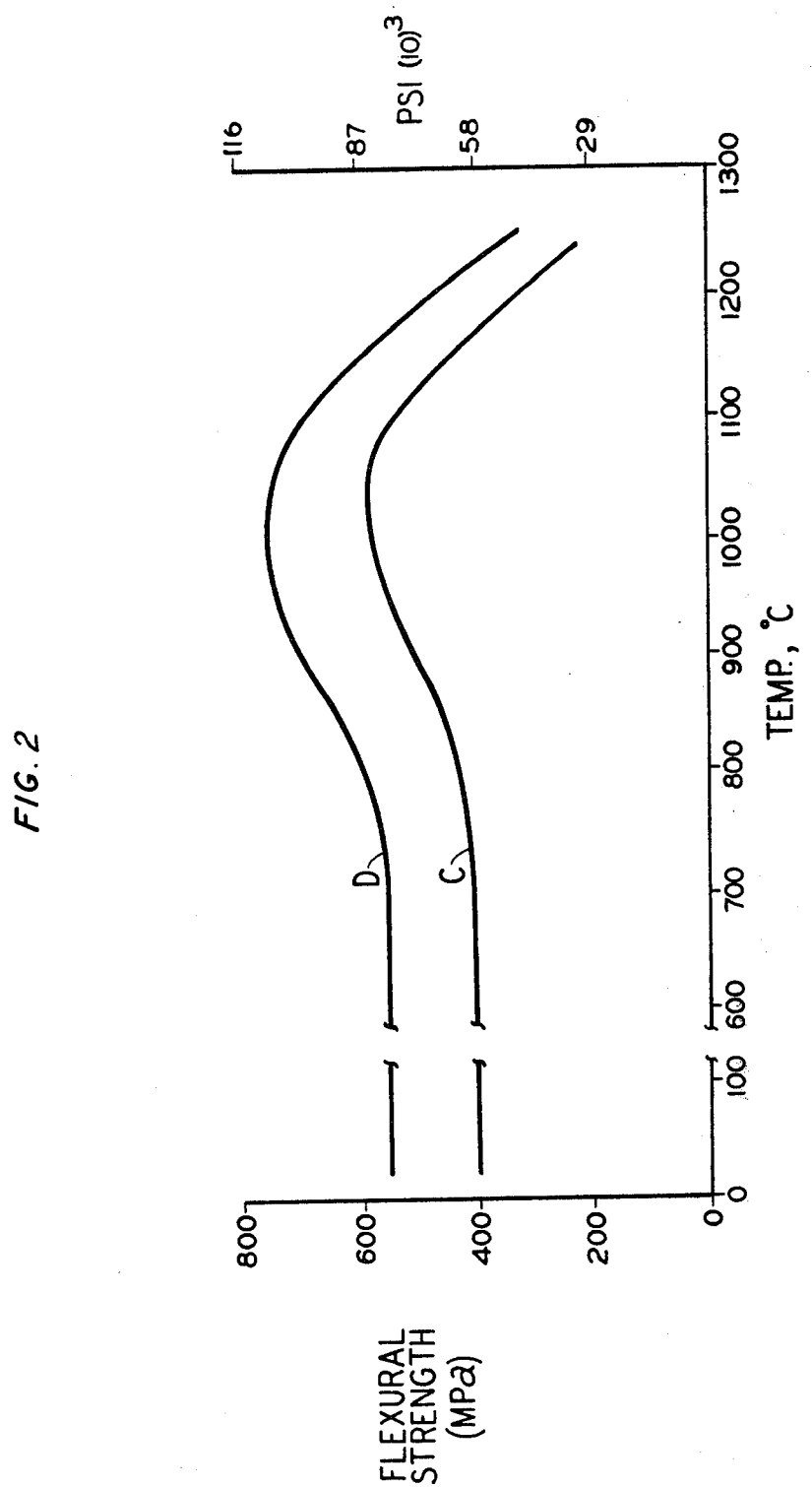
FIG. 2 shows graphically flexural strength data for a high silica content glass composite according to the present invention.

FIG. 2 demonstrates an exemplary high silica content glass, silicon carbide fiber (0° oriented) reinforced composite. Curves C and D represent lower and upper bounds, respectively, for sample data obtained with composites containing between 30% and 40% fiber loading, by volume.

These high silica content glass composites show flexural strengths in excess of 60,000 psi, and preferably in excess of 70,000 psi, even to temperatures up to about 1150° C.

Figure 3:
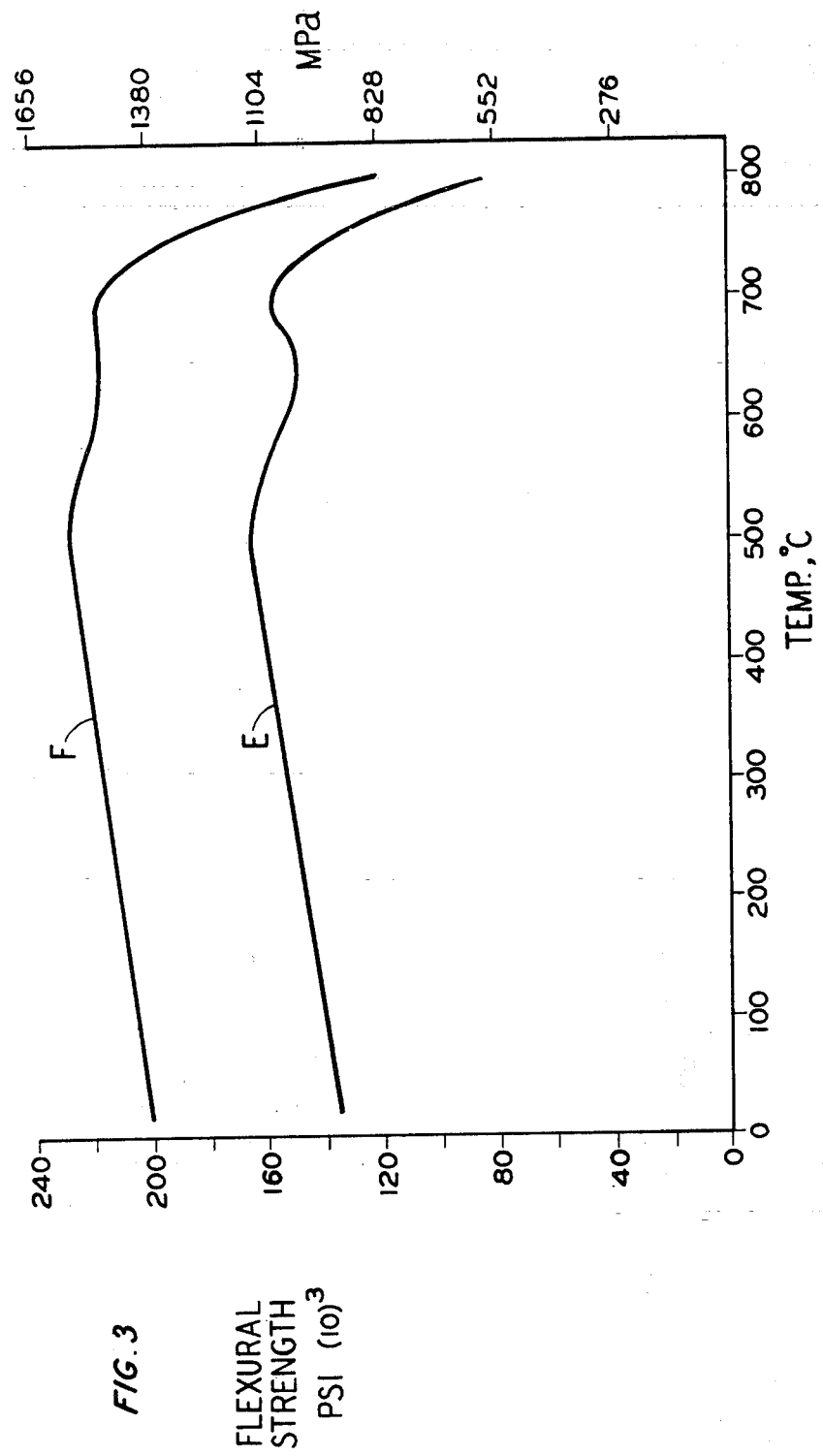
FIG. 3 shows flexural strength data for an aluminosilicate glass composite according to the present invention.

FIG. 3 demonstrates the exceptional flexural strength of an aluminosilicate glass-silicon carbide fiber reinforced composite. FIG. 3 (fiber loading of 50% by volume) shows for a 0°/90° fiber orientation (curve E) flexural strengths of over 75,000 psi and preferably over 100,000 psi maintained to temperatures up to about 700° C.; and for a 0° fiber orientation (curve F) flexural strengths of over 150,000 psi and preferably over 200,000 psi are maintained to temperatures up to about 700° C. Fracture toughness, as measured by a three-point notched beam test, results in critical stress intensity factors ($K_{IC}$) above 15,000 psi (inch)$^{\frac{1}{2}}$ for the 0°/90° orientation and above 25,000 psi (inch)$^{\frac{1}{2}}$ for the 0° orientation that are maintained up to about 700° C.

The silicon carbide reinforced glass composites of the present invention have particular utility as high temperature structural glass components in environments where oxidation resistance, high strength, and toughness are required and are especially adaptable to such properties in a high temperature environment (e.g. in excess of 600° C. and in some instances in excess of 1000° C.) such as in a gas turbine engine or internal combustion engine.

Although the invention has been shown and described with respect to detailed embodiments thereof, it should be understood by those skilled in the art that various changes and omissions in form and detail may be made therein without departing from the spirit and the scope of the invention.

We claim:

1. A silicon carbide fiber reinforced glass composite consisting essentially of about 30% to about 70% by volume silicon carbide fibers in a glass matrix selected from the group consisting of borosilicate glass, high silica content glass, aluminosilicate glass and mixtures thereof, the composite having a fracture toughness exemplified by a critical stress intensity factor above about 15,000 psi (inch)$^{\frac{1}{2}}$.

2. The composite of claim 1 having a flexural strength above about 60,000 psi up to a temperature of about 600° C.

3. The composite of claim 1 wherein the fibers have a substantially 0° orientation within the composite.

4. The composite of claim 1 wherein the fibers have a substantially 0°/90° orientation within the composite.

5. The composite of claim 1 wherein the silicon carbide fiber is present in an amount about 50% by volume.

6. The composite of claim 1 wherein the glass matrix is aluminosilicate glass and the composite has a flexural strength above about 150,000 psi at temperatures up to about 700° C.

7. The composite of claim 1 having a fracture toughness above about 25,000 psi (inch)$^{\frac{1}{2}}$.

8. The composite of claim 1 wherein the glass matrix is borosilicate glass and the composite has a flexural strength above about 40,000 psi at temperatures up to about 600° C.

9. The composite of claim 1 wherein the glass matrix is high silica content glass and the composite has a flexural strength above about 60,000 psi at temperatures up to about 1150° C.

10. The composite of claim 1 wherein the glass matrix is aluminosilicate glass and the composite has a flexural strength above about 75,000 psi at temperatures up to about 700° C.

* * * * *